United States Patent [19]

Nedderman, Jr.

[11] Patent Number: 5,517,935
[45] Date of Patent: May 21, 1996

[54] UNDERWATER VEHICLE POLYMER EJECTION CONTROL VALVE ASSEMBLY

[75] Inventor: William H. Nedderman, Jr., Middletown, R.I.

[73] Assignee: The United States of America as represented by the Secretary of the Navy, Washington, D.C.

[21] Appl. No.: 411,233

[22] Filed: Mar. 27, 1995

[51] Int. Cl.⁶ ........................................................ B63B 1/34
[52] U.S. Cl. ............................................... 114/67 A; 441/1
[58] Field of Search ............................... 114/67 R, 67 A; 441/1; 367/20, 154

[56] References Cited

U.S. PATENT DOCUMENTS

| | | | |
|---|---|---|---|
| 3,303,810 | 2/1967 | Giles | 114/67 A |
| 3,628,488 | 12/1971 | Gibson | 114/67 A |
| 4,186,679 | 2/1980 | Fabula et al. | 114/67 A |
| 4,987,844 | 1/1991 | Nadolink | 114/67 A |

*Primary Examiner*—Jesus D. Sotello
*Attorney, Agent, or Firm*—Michael J. McGowan; Prithvi C. Lall; Michael F. Oglo

[57] ABSTRACT

There is presented an underwater vehicle polymer ejection control valve assembly comprising a valve in communication with a polymer reservoir and in communication with ejection ports. The assembly further comprises a valve actuator including structure responsive to the vehicle in an ascending mode reaching a first predetermined depth in a water column to open the valve to place the polymer reservoir in communication with the ejection ports. The aforementioned structure is further responsive to the vehicle reaching a second and lesser predetermined depth to close the valve to interrupt communication between the polymer reservoir and the ejection ports.

10 Claims, 4 Drawing Sheets

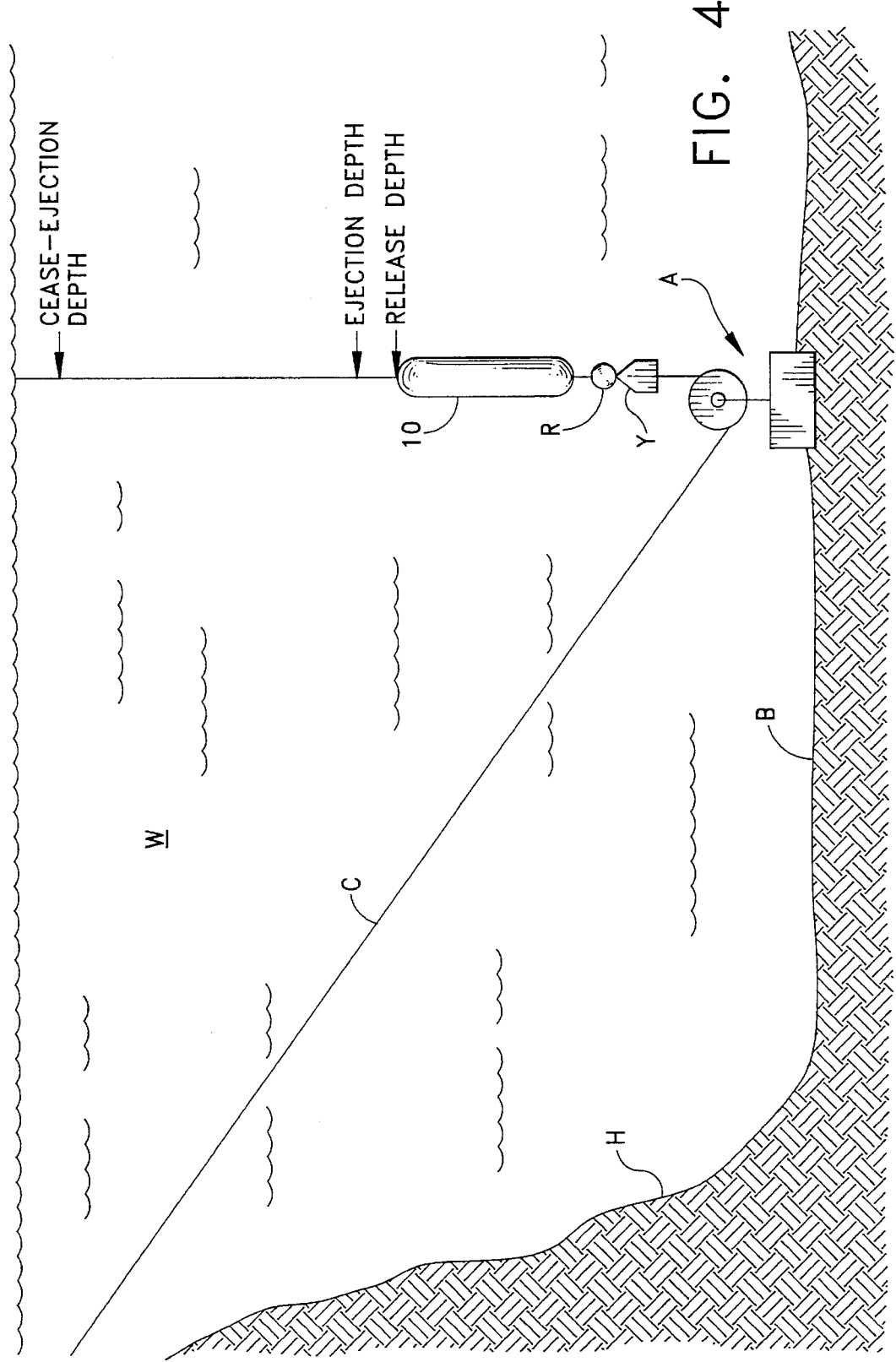

UNDERWATER VEHICLE POLYMER EJECTION CONTROL VALVE ASSEMBLY

STATEMENT OF GOVERNMENT INTEREST

The invention described herein may be manufactured and used by or for the Government of the United States of America for governmental purposes without payment of any royalties thereon or therefor.

BACKGROUND OF THE INVENTION (1) Field of the Invention

This invention relates to underwater vehicle polymer ejection control valves and is directed more particularly to an assembly including Such a control valve and a valve actuator responsive to changes in water pressure to automatically open and close the valve.

(2) Description of the Prior Art

It is known that ejection of a polymer from a forward portion of an underwater body, as the body travels through a water environment, causing the polymer to stream along the exterior surfaces of the body, has a salutary effect upon quiet running of the underwater body through the water.

In furtherance of the study of the effects of fluid polymers ejected from underwater bodies onto the exterior surfaces of the body, test vehicles have been utilized which are buoyant and adapted to travel, by virtue of their buoyancy, from a selected depth in a column of water, typically in a protected natural body of water having a depth of 1100 feet, or more, to the surface of the water. Such buoyant test vehicles (BTV) are provided in which a drag reducing polymer is ejected from the nose of the BTV so as to coat the hull of the BTV with polymer as the BTV travels through the water. The polymer typically is ejected by compressed air expanding in a housing holding liquid polymer, forcing the polymer out of the housing and out ejection ports in the BTV hull. Once the known ejection process is begun, it continues until all the polymer has been ejected.

It now is known that polymer flow rates sufficient to achieve the desired effect are quite small. By providing a valve assembly having facility for turning the polymer flow on and off at appropriate times, the amount of polymer on board the BTV can last through two or three runs of the BTV before requiring a refill.

Thus, there is a need for a BTV having a polymer ejection control valve assembly which operates to turn the ejection control valve on and off at preselected points in the travel of the BTV, so as to conserve polymer and thereby reduce time spent refilling the polymer reservoir.

SUMMARY OF THE INVENTION

It is, therefore, an object of the invention to provide a polymer ejection control valve assembly for underwater vehicles, and particularly for buoyant test vehicles.

A further object of the invention is to provide such a valve assembly wherein a valve actuator is adapted to open and close a valve rapidly, so as to provide precise control of the starting and stopping of polymer flow.

A still further object of the invention is to provide such a valve assembly wherein the valve actuator requires a minimum of electrical power and adds little weight to the BTV.

With the above and other objects in view, as will hereinafter appear, a feature of the present invention is the provision of an underwater vehicle polymer ejection control valve assembly comprising a valve in communication with a polymer reservoir and in communication with one or more ejection ports. The assembly further comprises a valve actuator comprising means responsive to the vehicle, in an ascending mode, reaching a first predetermined depth in a water column to open the valve to place the polymer reservoir in communication with the ejection port, and responsive to the vehicle reaching a second and lessor predetermined depth, to close the valve to interrupt communication between the polymer reservoir and the ejection port.

The above and other features of the invention, including various novel details of construction and combination of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings:

FIG. 4 is a diagrammatic showing of a test setting and a buoyant test vehicle therein.

DESCRIPTION OF THE PREFERRED EMBODIMENT

Referring to FIG. 4, it will be seen that a test setting may be a body of water W, preferably of a depth of 1100 feet, or more. On a bottom portion B of a water holder H in which the water W is disposed, there is placed a combination anchor and winch A, through which runs a pull-down cable C, having a first end connected to a buoy Y and release device R which, in turn, is connected to a buoyant test vehicle 10.

Figure 1:
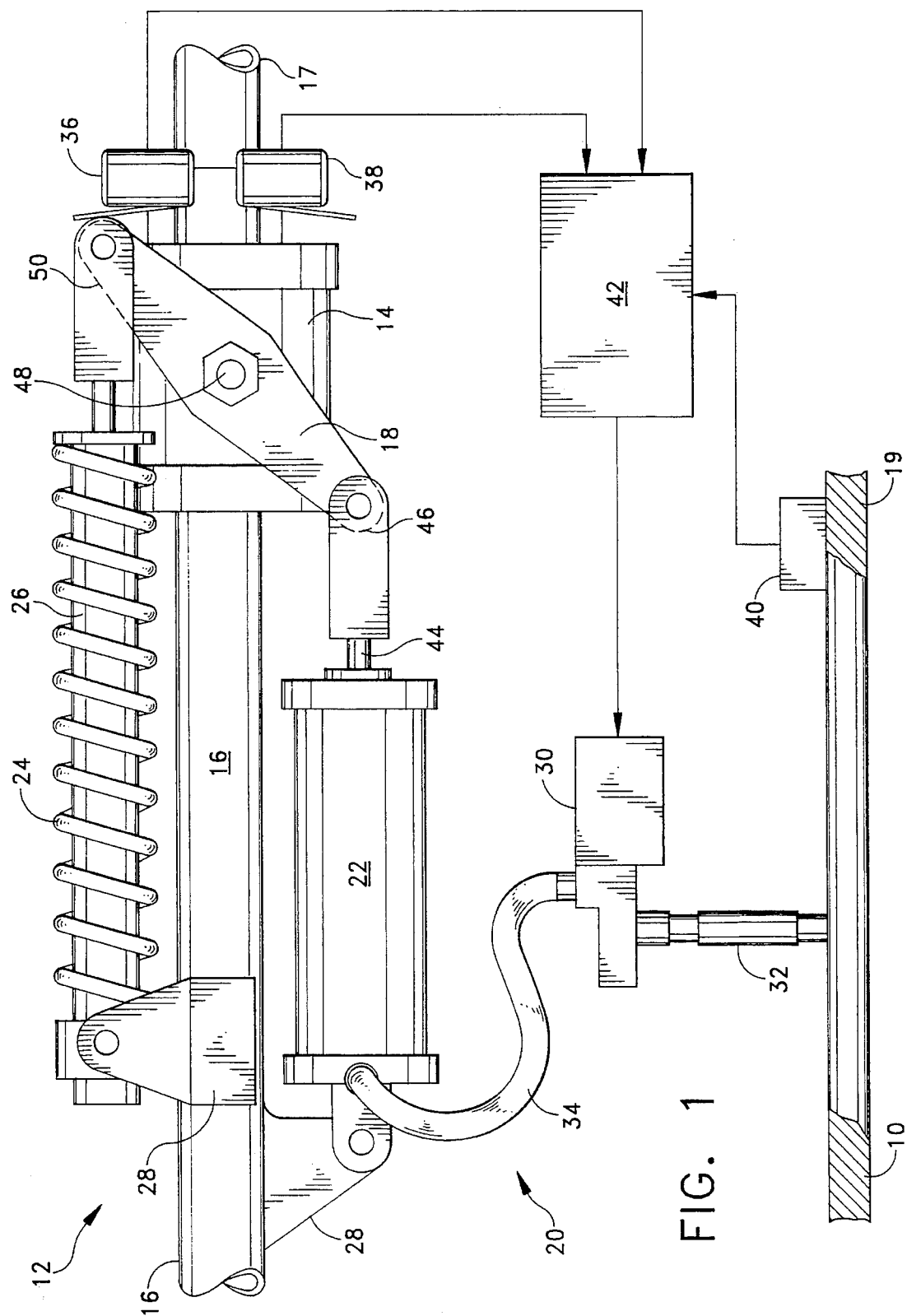
FIG. 1 is diagrammatic depiction of an underwater vehicle polymer ejection control valve assembly.
Figure 2:
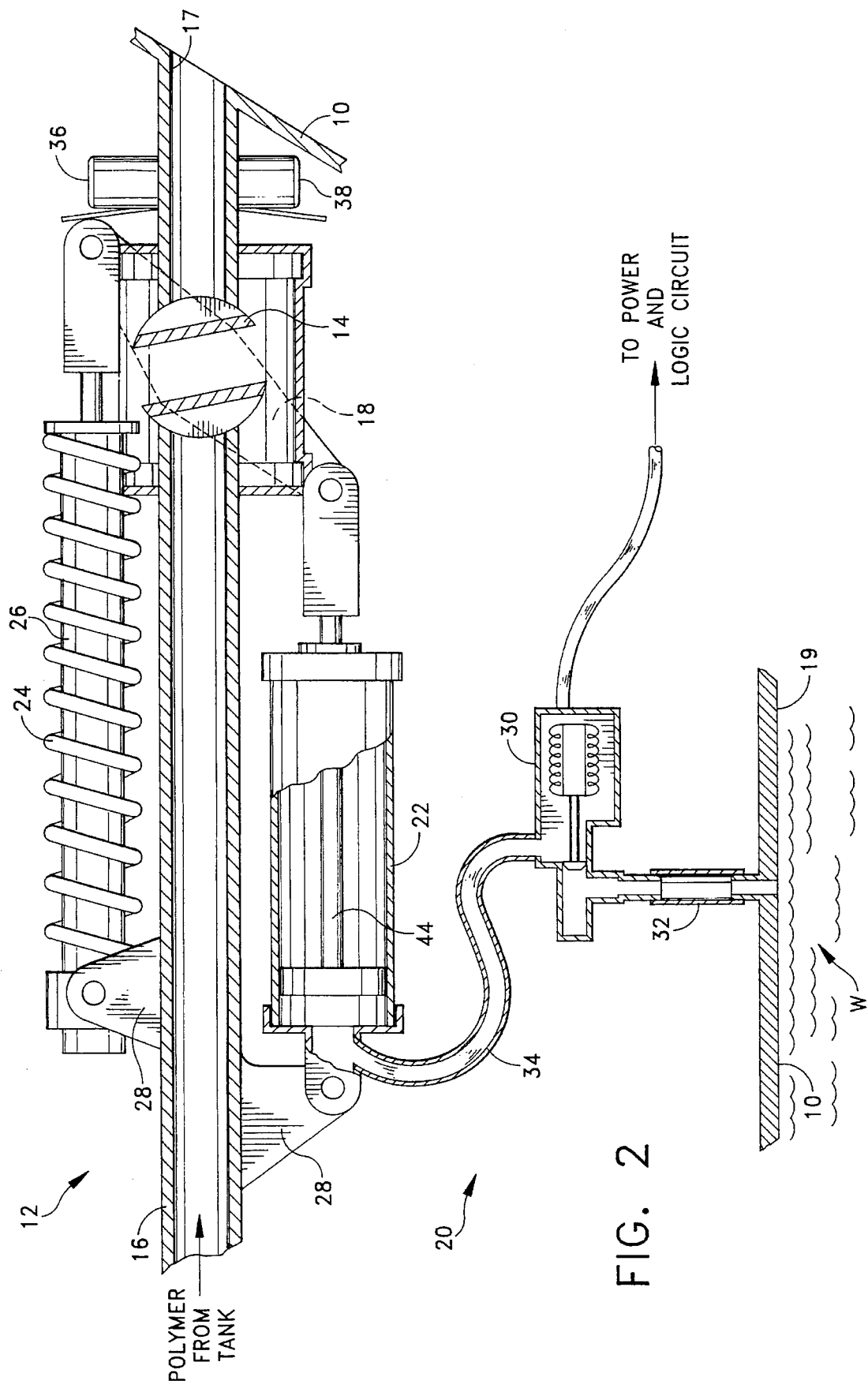
FIG. 2 is a diagrammatic sectional depiction of the assembly of FIG. 1, shown in a polymer retention disposition.
Figure 3:
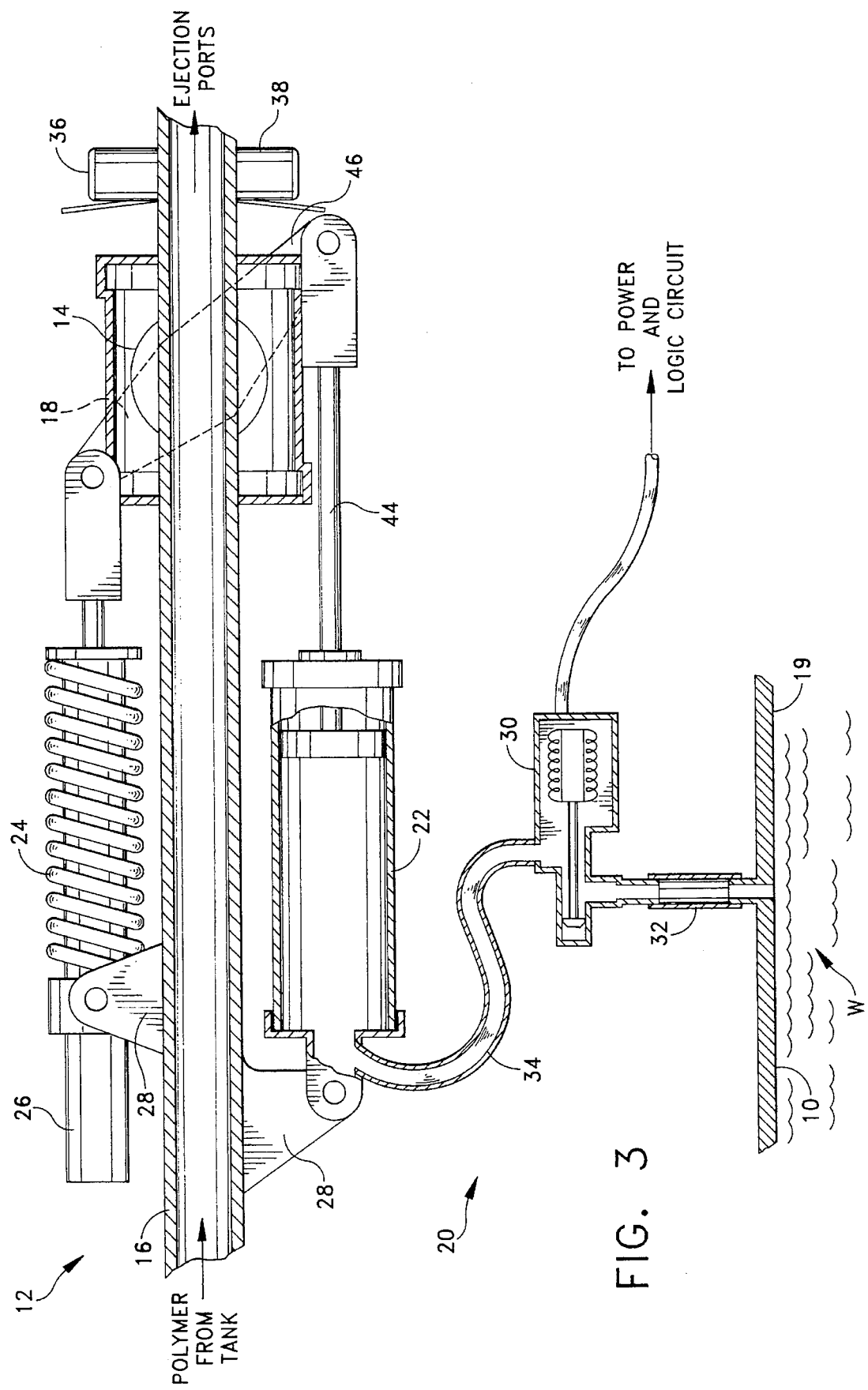
FIG. 3 is similar to FIG. 2, but showing the assembly in a polymer delivery disposition.

Referring to FIGS. 1–3, it will be seen that a polymer ejection control valve assembly 12, located in the test vehicle 10, includes a valve 14 in communication with a polymer reservoir comprising a conduit 16 extending to a tank (not shown) for retaining a draft reducing polymer slurry, and in communication with one or more ejection ports 17 in the hull 19 of the test vehicle 10. The valve 14 may be a ball valve.

The control valve assembly 12 further includes a valve actuator 20, which, in turn, includes a bellcrank 18 for opening and closing the valve 14, a hydraulic cylinder 22 adapted to operate with sea water at high pressure, a coil spring 24, a spring retainer 26, and a bracket 28 on which are mounted the cylinder 22 and the coil spring 24.

The valve actuator 20 further includes a solenoid valve 30, high pressure tubing 32 for conveying high pressure seawater between the vehicle hull 19 and the solenoid valve 30, and high pressure hose 34 for conveying high pressure seawater between solenoid valve 30 and hydraulic cylinder 22.

As shown in FIG. 1, a first microswitch 36 is positioned to detect the opening of the valve 14, and a second microswitch 38 is positioned to detect the closing of the valve 14. A depth sensor 40 is disposed on the hull 19 of the vehicle 10. A logic circuit 42 is in communication with microswitch 36, microswitch 38 and the depth sensor 40, to receive signals therefrom, and is in communication with the solenoid valve 30 for delivering a control signal thereto. When the vehicle 10 is at the surface, the solenoid valve 30 is closed and the bellcrank 18 is in contact with first microswitch 36.

To lower the vehicle 10 so as to start a test run, the pull-down cable C is drawn through the anchor and winch A to pull the vehicle 10 toward the bottom B of the water holder H. As the vehicle 10 is hauled down to release depth, the depth sensor 40 measures depth. When the vehicle reaches preselected polymer cease-ejection and ejection depths on the way down, first and second enable switches (not shown) in the logic circuit 42 respond to signals from the depth sensor 40 and close at their respective depths. The solenoid valve 30 remains closed (FIG. 2), so that the valve 14 remains closed under the influence of the spring 24. The vehicle 10 is hauled down to release depth (typically about 1100 feet) and held for launch.

Upon activation of the release device R, as by a signal from shore, the buoyant test vehicle 10 moves through buoyancy toward the surface of the water W. When, in its ascent, the vehicle 10 again reaches the preselected polymer release depth, both enable switches in the logic circuit 42 are activated. The logic circuit responds to a signal from depth sensor 40 by signaling the solenoid valve 30 to open (FIG. 3), allowing seawater to flow through the high pressure tubing 32 and the high pressure hose 34 to fill the cylinder 22 to drive a piston rod 44 to the right, as viewed in FIG. 3. A free end of the piston rod 44 is connected to a first free end 46 of bellcrank 18, to pivot the bellcrank about a central pivot point 48 (FIG. 1), to open the valve 14. Opening of the valve 14 permits polymer to flow through the polymer conduit 16 and valve 14 to ejection ports 17. The action of free end 46 of bellcrank 18 against second microswitch 38 closes microswitch 38 and signals circuit 42 to close solenoid valve 30, to maintain water pressure in cylinder 22.

As the bellcrank 18 opens valve 14, it simultaneously moves a bellcrank second free end 50 to compress coil spring 24. When depth sensor 40 senses a preselected cease-ejection depth (typically at a depth of about 100 feet), depth sensor 40 signals logic circuit 42 which opens solenoid valve 30 and resets the enabling switches. With cylinder 22 depressurized, stored energy in coil spring 24 rapidly closes valve 14 and turns bellcrank 18 to force water from the cylinder 22 and to stop ejection of polymer. When bellcrank 18 contacts first microswitch 36, logic circuit 42 closes solenoid valve 30.

Thereafter, the vehicle 10 rises to the surface of the water W. Upon release of the cable C, the buoy Y brings the free cable end to the surface where, if another test run is desired, the vehicle may be connected to the release device R for again hauling the vehicle down to release depth.

Thus, the valve actuator 20 is powered by pressure difference between the pressure outside the vehicle 10 and the pressure inside the vehicle. Inasmuch as the vehicle 10 is hauled down to substantial depths (around 1100 feet) before being released to rise to the surface by its own buoyancy, a very large pressure difference is available to power the operations of the actuator. The pressure difference available, for example, at a depth of 1100 feet is approximately 500 p.s.i. The very large pressure difference at typical maximum depths for polymer ejection allows the actuator 20 to open the control valve 14 very rapidly.

The control valve assembly described above allows polymer ejection to occur during a selected ejection phase of buoyant test vehicle ascent and prevents polymer ejection during other phases of vehicle operation, permitting, typically, two or three test runs on a tank of polymer, opposed to the single run heretofore experienced. The ejection phase is precisely bounded by the vehicle's measuring of its depth and comparing the measured depth with a preselected ejection depth and cease-ejection depth. The control valve 14 opens and closes rapidly, ensuring precise definition of the ejection phase. Inasmuch as seawater pressure is the principal driving force, the control assembly described herein uses very little electrical power.

It is to be understood that the present invention is by no means limited to the particular construction herein disclosed and/or shown in the drawings, but also comprises any modifications or equivalents within the scope of the claims.

What is claimed is:

1. An underwater vehicle polymer ejection control valve assembly comprising:

a valve in communication with a polymer reservoir and in communication with an ejection port; and a valve actuator comprising means responsive to said vehicle in an ascending mode reaching a first predetermined depth in a water column to open said valve to place said polymer reservoir in communication with said ejection port said means being responsive to said vehicle reaching a second and lesser predetermined depth, to close said valve to interrupt communication between said polymer reservoir and said ejection port.

2. The assembly in accordance with claim 1 wherein said valve actuator includes a bellcrank, movement of said bellcrank being operable to open and close said valve.

3. The assembly in accordance with claim 2 wherein said valve actuator further comprises a cylinder having a piston rod extending therefrom, one end of said piston rod being connected to a first end of said bellcrank and operative to move said bellcrank about a pivot point.

4. The assembly in accordance with claim 3 wherein said valve actuator further comprises a spring connected to a second end of said bellcrank and operative to move said bellcrank about said pivot point.

5. The assembly in accordance with claim 4 wherein said valve actuator further comprises a solenoid valve adapted to open and close communication between said cylinder and said water column through a seawater opening in the hull portion of said vehicle, said piston rod of said cylinder being movable by water from said water column.

6. The assembly in accordance with claim 5 wherein said valve actuator further comprises a logic circuit adapted to signal said solenoid valve to open and close.

7. The assembly in accordance with claim 6 wherein said valve actuator further comprises a depth sensor adapted to measure depth of said vehicle and signal said depth measurement to said logic circuit.

8. The assembly in accordance with claim 7 wherein said valve actuator further comprises microswitch means adapted to signal open and closed status of said valve to said logic circuit.

9. The assembly in accordance with claim 8 wherein said logic circuit is adapted to maintain said solenoid valve in a closed condition as said vehicle descends underwater, and to permit said solenoid valve to open as said vehicle ascends underwater upon signal from said depth sensor.

10. An underwater vehicle polymer ejection control valve assembly comprising:

a valve in communication with a polymer reservoir and in communication with an ejection port in a hull portion of said vehicle; and a valve actuator comprising a pressure sensor operative to sense the depth of said vehicle in a water column, a logic circuit for receiving a first signal from said pressure sensor and for directing admittance of water from said water column when said vehicle is in an ascending mode only, a cylinder for receiving said water from said water column, a piston and rod in said cylinder and movable by said water, a bell crank operable by said rod to open said valve to place said polymer reservoir in communication with said ejection port, a spring member connected to said bellcrank and operative to bias said bellcrank in a valve closing direction, said logic circuit being operative to receive a second signal from said pressure sensor and to direct release of said water from said cylinder to said water column, and said spring member being operative to move said bellcrank to close said valve and move said piston in said cylinder to expel said water from said cylinder.

* * * * *